(12) United States Patent
Friesel

(10) Patent No.: US 7,047,161 B1
(45) Date of Patent: May 16, 2006

(54) VIRTUAL SENSOR FOR DATA AND SENSOR FUSION

(75) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/826,241

(22) Filed: Apr. 15, 2004

Related U.S. Application Data

(60) Provisional application No. 60/477,305, filed on Jun. 10, 2003.

(51) Int. Cl.
*G06F 15/00* (2006.01)

(52) U.S. Cl. .................................. 702/189; 702/191

(58) Field of Classification Search ................ 702/104, 702/182, 188, 189, 190, 191; 455/226.3; 356/73.1, 106
See application file for complete search history.

(56) References Cited

U.S. PATENT DOCUMENTS

| 5,999,893 A * | 12/1999 | Lynch et al. ................. 702/181 |
| 6,909,997 B1 * | 6/2005 | Chen et al. .................. 702/189 |
| 2003/0186663 A1 * | 10/2003 | Chen et al. ............. 455/226.3 |
| 2003/0191610 A1 * | 10/2003 | Chen et al. .................. 702/191 |

* cited by examiner

*Primary Examiner*—Bryan Bui
(74) *Attorney, Agent, or Firm*—Duane Morris LLP

(57) ABSTRACT

A plurality of sensors observe an object, and the raw sensor data is processed to produce evidence signals representative of characteristics which may be used to classify the object as to type. The evidence from the plurality of sensors is fused to generate fused or combined evidence. Thus, the fused evidence is equivalent to signals produced by a virtual sensor. The fused evidence is applied to a taxonomic classifier to determine the object type.

3 Claims, 4 Drawing Sheets

VIRTUAL SENSOR FOR DATA AND SENSOR FUSION

CROSS-REFERENCE TO RELATED APPLICATIONS

This application claims the benefit of the priority date of Provisional Application No. 60/477,305, filed Jun. 10, 2003.

FIELD OF THE INVENTION

This invention relates to fusion of information from sensors for the purpose of classifying objects or conditions observed by the sensors.

BACKGROUND OF THE INVENTION

The use of sensors to determine the nature or classification of objects is old. Such sensors receive raw data from an observed direction or space in either a passive or active manner, and process the information according to some algorithm in order to make a determination of the nature of the object or condition. For example, a radar system operating as an active sensor may transmit radar signals in a desired direction, and then processes signals returned from a target to determine various characteristics of the received signal in order to characterize the target as, say, an F-15 fighter aircraft rather than a C-130 transport aircraft. A passive sensor might detect the emissions of an active sensor carried by a remote platform, determine the type of sensor detected, and identify platforms capable of carrying such an active sensor.

A great deal of work has been done in the field of fusion of the outputs of various sensors associated with a battle region, in order to rationalize the results of the many sensors observing the region from different vantage points under different operating conditions.

Improved or alternative fusion is desired.

SUMMARY OF THE INVENTION

A method according to an aspect of the invention is for fusing information from plural sources. The method comprises the step of observing an object with at least first and second sensors, each of which (a) evaluates evidence or information and (b) based on the evidence, assigns a taxonomic classification to its observation of the object. The method further comprises the step of fusing the evidence from the first and second sensors to produce compound evidence. A classification is assigned based on the compound evidence. In a particular embodiment of the invention, the classification based on compound evidence is taxonomic or type classification.

DESCRIPTION OF THE INVENTION

Figure 1:
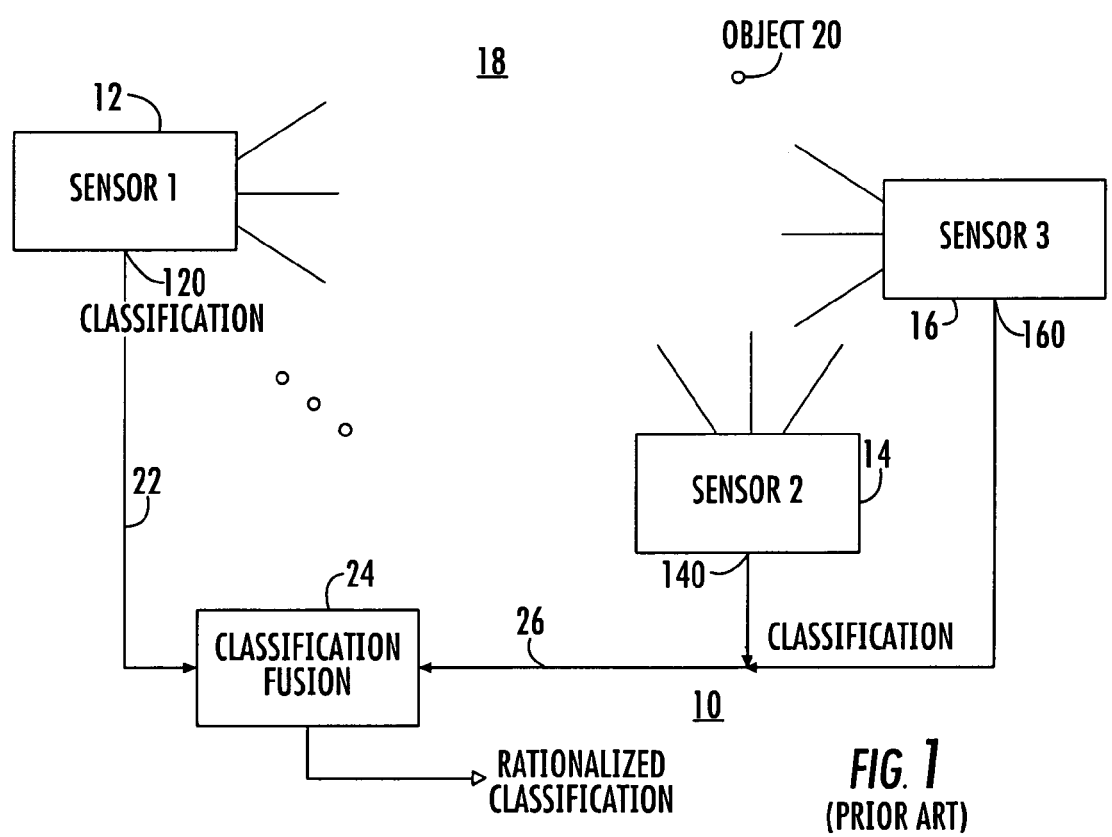
FIG. 1 is a simplified block diagram of a prior-art multiple-sensor fusion arrangement.

In FIG. 1, a system 10 includes a first sensor 12, a second sensor 14, and a third sensor 16, each observing a region designated generally as 18 which happens, at the illustrated time, to contain an object 20. For definiteness, the region 18 may be considered to be a region near a battlefield, object 20 may be an aircraft, and each of sensors 12, 14, and 16 may be any type of active or passive sensors used to detect and classify aircraft. The classification produced by sensor 1 is reported at an output port 12o, and is coupled by any means, specifically as a hard-wired path 22, to a classification fusion function illustrated as a block 24. Similarly, sensors 14 and 16 each generate a classification or determination of the type of object at their output ports 14o and 16o, and these determinations are coupled to block 24 by any means, which in FIG. 1 is illustrated as a hard-wired path 26.

In the prior-art arrangement of FIG. 1, classification fusion arrangement 24 performs processing in known manner to rationalize the determinations made by the various sensors. As a simple example, if a large number of sensors report that object 20 is an F-16 aircraft, and one sensor reports that it is a battleship flying at altitude, block 24 may reject the battleship classification and produce a rationalized classification at its output port 240 to the effect that the object 20 is an F-16.

Figure 2:
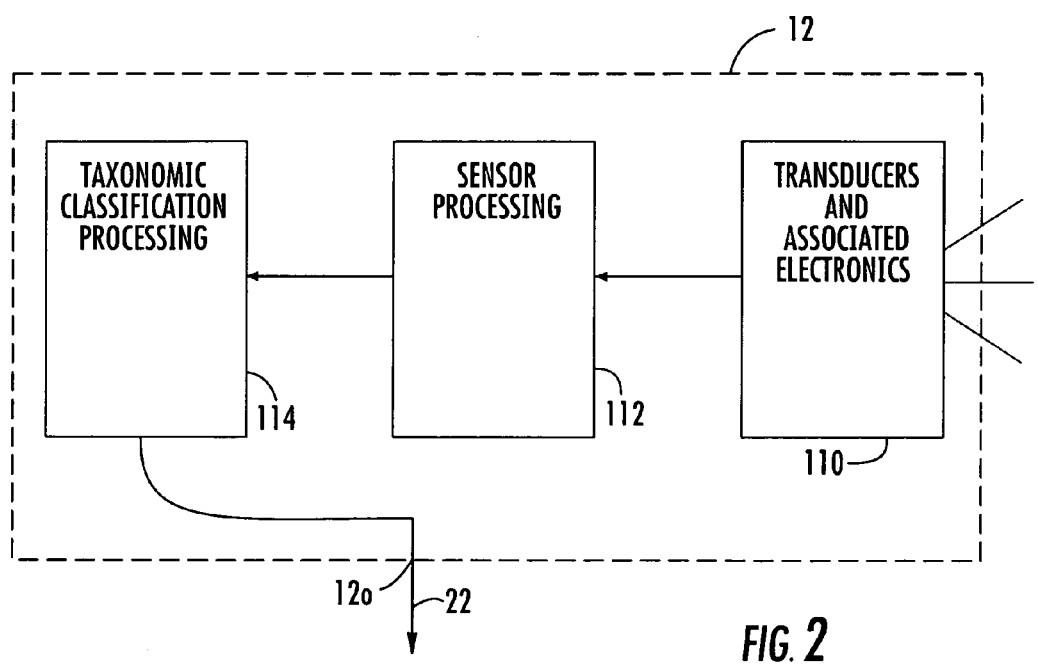
FIG. 2 is a simplified block diagram of a prior-art sensor of FIG. 1, showing how evidence provides the basis for taxonomic classification.

In FIG. 2, exemplary sensor 12 is illustrated as including a block 110 representing one or more transducers with their associated electronics. This might be, for example, the antenna, transmitter, and receiver of a radar system in the context of an active sensor, or a staring array and its amplifiers in the context of a heat sensor.

The signals representing raw information about the object sensed are applied from block 110 of FIG. 2 to a block 112, which represents processing performed by the sensor on the raw data to generate information which allows classification of the type of object. This processing might be spectral processing of the received signal in the case of a radar system. The processing might also include decoding and information processing in the case of intercepted data or voice transmissions, shape estimation in the case of imaging sensors, kinematic information such as acceleration, and the like.

The evidentiary information produced by block 112 of FIG. 2 is applied to a taxonomic (type) classification block 114, which makes a determination of the object type by comparing the evidence with stored information relating to the characteristics of the evidence for various types of objects. The final classification is output from port 12o for transmission over path 22.

Figure 3:
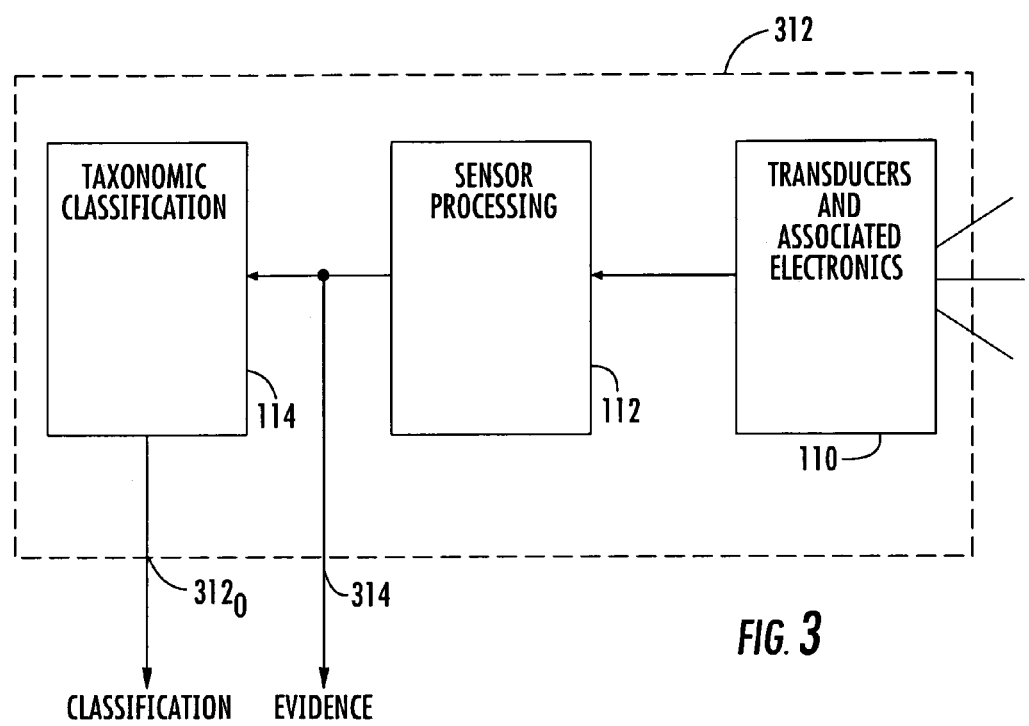
FIG. 3 is a simplified block diagram of a sensor according to an aspect of the invention, showing that the evidence is available externally.

In FIG. 3, elements corresponding to those of FIG. 2 are designated by like reference numerals. In FIG. 3, a sensor 312 according to an aspect of the invention produces its taxonomic classification at an output port 312o, also includes a further output port 314 at which the evidence used by taxonomic classification block 114 can be accessed.

Figure 4:
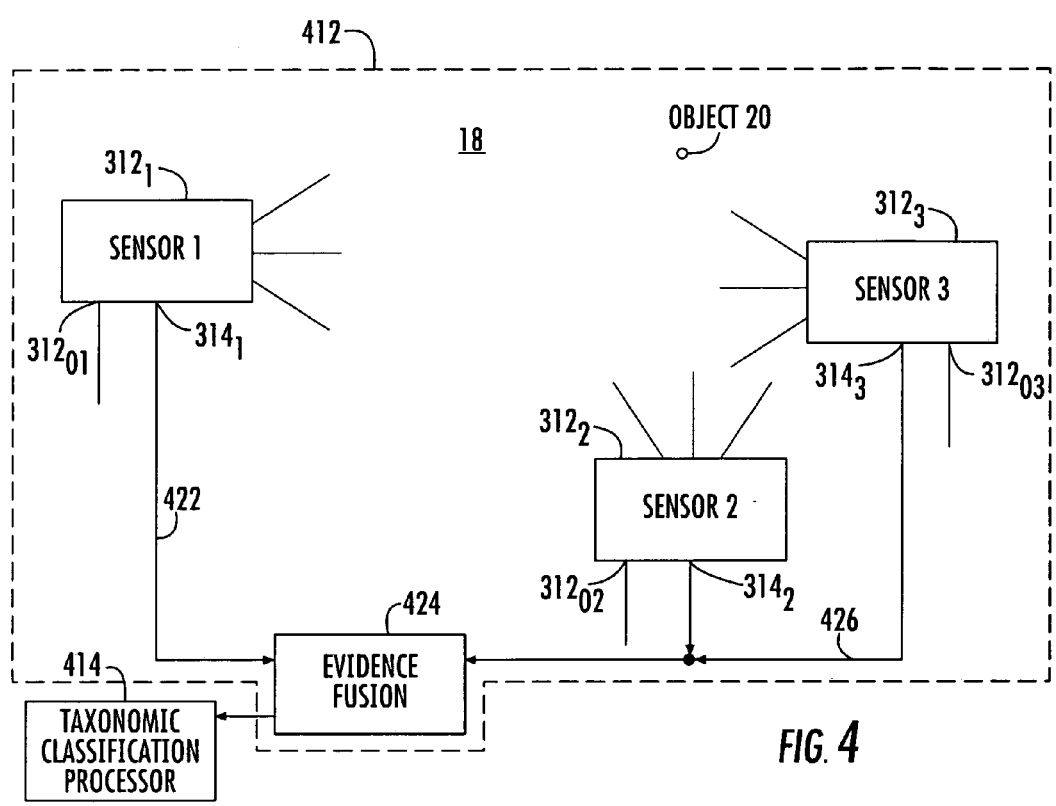
FIG. 4 illustrates a virtual sensor incorporating fused evidence from plural sensors, together with a taxonomic classifier operating on the fused evidence to classify the target or object.

In FIG. 4, first, second, and third sensors $312_1$, $312_2$, and $312_3$ are similar to sensor 312 of FIG. 3. Each of the three sensors of FIG. 4 observes object 20. In addition to producing three classifications at output ports $312_{o1}$, $312_{o2}$, and $312_{o3}$, the externally available evidence from output ports $314_1$, $314_2$, and $314_3$ is coupled by paths, illustrated as hard-wired paths 422 and 426 to an evidence fusion block 424. Evidence fusion block 424 produces fused evidence in any one of a variety of prior-art manners, to thereby effectively combine the evidence of sensors $312_1$, $312_2$, and $312_3$ into the equivalent of a single virtual sensor processor 412.

The combined evidence is presented to a taxonomic classification block 414, which can be in accordance with any prior-art arrangement, and more specifically may be similar to block 24 of FIG. 1. Block 414 produces a taxonomic classification based on the combined evidence.

In general, the calculations are performed by letting p(E|a) be the likelihood that a sensor produces evidence E when an object that the sensor observes has a characteristic a. A typical sensor will be able to produce more kinds of evidence $E_n$, n=1, 2, 3, . . . when an object with characteristic a is observed. Let p($E_n$|a) be the likelihood that a sensor will produce evidence $E_n$ when an object observed by the sensor has a characteristic a. As a specific example, a sensor finds a dominant frequency of 100 KHz (kilohertz) when observing a J-100 aircraft engine, but may find a frequency of 120 KHz during the observation. The likelihood p(100 KHZ|J-100) of observing 100 KHz may be 0.95, and the likelihood p(120 KHz|J-100)=0.05. In general, objects may have different characteristics $a_k$, k=1, 2, 3, . . . . A sensor may produce the same evidence $E_n$ when objects with different characteristics are observed. Let p($E_n$|$a_k$) be the likelihood that a sensor will produce evidence $E_n$ when an observed object has a characteristic $a_k$. As an example, a sensor may find a dominant frequency of 100 KHz when observing a J-100 engine, but may find the same frequency when observing a J-150 engine. The likelihood p(100 KHz|J-100) of observing 100 KHz may be 0.95, while the likelihood p(100 KHz|J-150) may be 0.40 (the sums need not add to 1.00). Let $p_j(E_n|a_k)$ be the likelihood that a sensor j produces evidence $E_n$ when an observed object has a characteristic $a_k$. The invention applies to any sensor, termed a "characterized" sensor, for which $p_j(E_n|a_k)$ is either known or can be estimated for one or more $E_n$ and one or more $a_k$.

The classifications produced by sensors 312$_1$, 312$_2$, and 312$_3$ may be used for other purposes or not used, as desired.

Other embodiments of the invention will be apparent to those skilled in the art. For example, while hard-wired paths have been illustrated for coupling the evidence from each sensor to a combiner, the paths may be, or include, wireless portions, or be encoded, or in general of any appropriate sort.

Thus, in a very general aspect of the invention, a plurality of sensors observe an object, and the raw sensor data is processed to produce evidence signals representative of characteristics which may be used to classify the object as to type. The evidence from the plurality of sensors is fused to generate fused or combined evidence. Thus, the fused evidence is equivalent to signals produced by a virtual sensor. The fused evidence is applied to a taxonomic classifier to determine the object type.

More particularly, a method according to an aspect of the invention is for fusing information from plural sources (312$_1$, 312$_2$, and 312$_3$). The method comprises the step of observing an object with at least first (312$_1$) and second (312$_2$) sensors, each of which (a) evaluates evidence or information and (b) based on the evidence, assigns a taxonomic classification to its observation of the object. The method further comprises the step of fusing the evidence (block 424) from the first and second sensors to produce compound evidence. A classification is assigned (block 414) based on the compound evidence. In a particular embodiment of the invention, the classification based on compound evidence is taxonomic or type classification.

What is claimed is:

1. A method for fusing information from plural sources, said method comprising the steps of:

observing an object with plural sensors including at least first and second sensors, each of which (a) evaluates evidence or information and (b) based on said evidence or information, assigns a taxonomic (type) classification to its observations of said object;

fusing said evidence from at least said first and second sensors to produce compound evidence; and assigning a classification based on said compound evidence.

2. A method according to claim 1, wherein said classification based on compound evidence is a taxonomic classification.

3. A method according to claim 1, wherein said sensors are spatially separated.

* * * * *